(12) United States Patent
Martin

(10) Patent No.: US 10,195,964 B2
(45) Date of Patent: Feb. 5, 2019

(54) ADJUSTING SYSTEM FOR A SEAT, AND SEAT

(71) Applicant: Bayerische Motoren Werke Aktiengesellschaft, Munich (DE)

(72) Inventor: Robert Martin, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 251 days.

(21) Appl. No.: 15/221,717

(22) Filed: Jul. 28, 2016

(65) Prior Publication Data

US 2016/0332540 A1 Nov. 17, 2016

Related U.S. Application Data

(63) Continuation of application No. PCT/EP2015/051354, filed on Jan. 23, 2015.

(30) Foreign Application Priority Data

Jan. 30, 2014 (DE) .................. 10 2014 201 633

(51) Int. Cl.
*B60N 2/06* (2006.01)
*B60N 2/16* (2006.01)
(Continued)

(52) U.S. Cl.
CPC .............. *B60N 2/14* (2013.01); *B60N 2/06* (2013.01); *B60N 2/163* (2013.01); *B60N 2/1605* (2013.01);
(Continued)

(58) Field of Classification Search
CPC ... B60N 2/06; B60N 2/10; B60N 2/12; B60N 2/14; B60N 2/16; B60N 2/1605;
(Continued)

(56) References Cited

U.S. PATENT DOCUMENTS 1,577,807 A 3/1926 Orwick
4,526,446 A * 7/1985 Adams .................. B60R 1/081
359/864
(Continued)

FOREIGN PATENT DOCUMENTS

DE 1 500 878 B1 5/1970
DE 102014201633 A1 * 7/2015 ............... B60N 2/06
(Continued)

OTHER PUBLICATIONS

Machine Translation JP4492008B2, http://translationportal.epo.org/emtp/translate/?ACTION=description-retrieval&COUNTRY=JP&ENGINE=google&Format=docdb&KIND=A&LOCALE=en_EP&NUMBER=2003063289&OPS=ops.epo.org/3.2&SRCLANG=ja&TRGLANG=en, Jun. 1, 2018 (Year: 2018).*
(Continued)

*Primary Examiner* — Ryan D Kwiecinski
(74) *Attorney, Agent, or Firm* — Crowell & Moring LLP

(57) ABSTRACT

An adjusting system is provided for a seat, in particular a motor vehicle seat. A longitudinal axis, in which a person sitting on the seat is facing, is defined for the seat, and a transverse axis running perpendicularly to the longitudinal axis and a height axis running perpendicularly to the transverse axis and the longitudinal axis are also defined. The adjusting system comprises at least one first bearing ring which can be connected to the seat, at least one second bearing ring which can be connected to a seat mounting, and a plurality of adjusting rings which are connected to one another in a sequential manner and which are arranged between the first bearing ring and the second bearing ring. The adjusting rings can be rotated relative to one another in order to pivot the seat selectively about the longitudinal axis, the transverse axis, and the height axis.

12 Claims, 3 Drawing Sheets

(51) Int. Cl.
*B60N 2/14* (2006.01)
*B60N 2/18* (2006.01)
*B60N 2/39* (2006.01)
*B60N 2/02* (2006.01)

(52) U.S. Cl.
CPC ......... *B60N 2/1695* (2013.01); *B60N 2/1828* (2013.01); *B60N 2/39* (2013.01); *B60N 2002/022* (2013.01); *B60N 2002/0208* (2013.01)

(58) Field of Classification Search
CPC ................. B60N 2/1695; B60N 2/39; B60N 2002/0204; B60N 2002/0208; B60N 2002/0212; B60N 2002/0216; B60N 2002/022
See application file for complete search history.

(56) References Cited

U.S. PATENT DOCUMENTS

| | | | |
|---|---|---|---|
| 4,544,201 A | 10/1985 | Rogers, Jr. | |
| 6,997,512 B1 * | 2/2006 | Yu | A47C 3/16 108/94 |
| 7,093,900 B1 | 8/2006 | Schon | |
| 9,180,792 B2 * | 11/2015 | Haller | B60N 2/508 |
| 2002/0023995 A1 * | 2/2002 | Yoshida | B60N 2/14 248/425 |

FOREIGN PATENT DOCUMENTS

| | | | | |
|---|---|---|---|---|
| DE | 102014107814 A1 * | 12/2015 | | B60N 2/062 |
| DE | 202015103313 U1 * | 9/2016 | | B60N 2/938 |
| EP | 0 181 989 A1 | 5/1986 | | |
| EP | 0 301 461 B1 | 6/1993 | | |
| GB | 2 124 484 A | 2/1984 | | |
| JP | 60-85235 U | 6/1985 | | |
| JP | 08113065 A * | 5/1996 | | B60N 2/072 |
| JP | 9-2112 A | 7/1997 | | |
| JP | 10217811 A * | 8/1998 | | F16C 19/10 |
| JP | 2003063288 A * | 3/2003 | | F16C 19/10 |
| JP | 3584550 B2 * | 11/2004 | | B60N 2/14 |
| JP | 4492008 B2 * | 6/2010 | | B60N 2/14 |
| WO | WO-9318318 A1 * | 9/1993 | | A47K 3/001 |
| WO | WO 00/22964 A1 | 4/2000 | | |

OTHER PUBLICATIONS

International Search Report (PCT/ISA/210) issued in PCT Application No. PCT/EP2015/051354 dated Apr. 21, 2015 with English translation (five pages).

German-language Written Opinion (PCT/ISA/237) issued in PCT Application No. PCT/EP2015/051354 dated Apr. 21, 2015 (five pages).

German Office Action issued in counterpart German Application No. 10 2014 201 633.9 dated Mar. 18, 2014 with partial English translation (10 pages).

* cited by examiner

ADJUSTING SYSTEM FOR A SEAT, AND SEAT

CROSS REFERENCE TO RELATED APPLICATIONS

This application is a continuation of PCT International Application No. PCT/EP2015/051354, filed Jan. 23, 2015, which claims priority under 35 U.S.C. § 119 from German Patent Application No. 10 2014 201 633.9, filed Jan. 30, 2014, the entire disclosures of which are herein expressly incorporated by reference.

BACKGROUND AND SUMMARY OF THE INVENTION

The present invention relates to an adjusting system for a seat which, in particular, is installed in a vehicle. The invention further relates to a seat, the seat advantageously being provided in a vehicle.

Seats for vehicles are known from the state of the art, whose seat adjusting functions are implemented by adjustable control arms or levers. A vehicle seat is known, for example, from EP 0181989 A1 which permits the adjusting of the inclination of the seat rest, of the backrest, of the position and/or the inclination of the headrest and/or of the position and/or the height of the seat. For this purpose, the driver seat has at least one actuator, at least one actuator control device, an adjusting circuit and a circuit memory for presetting and programming desired positions.

Another example is known from EP 0301461 B1. This document discloses a motor-driven vehicle seat, which consists of an adjustable backrest, a seat area mounted on a carriage as well as two horizontal longitudinal guides with a chute sliding on the latter. The seat area is connected with the backrest, the backrest being movable relative to the seat area.

However, seats according to the state of the art have the disadvantage that they can be adjusted only in a conditional or restricted manner. This results in the loss of comfort for the driver or the person sitting in the seat. Since the possibility of extensively adjusting the seats requires the presence of numerous electronic components and actuators, the need for repairs and therefore the total costs of the seat will rise. In addition, further adjusting functions, such as a seat inclination adjustment about a longitudinal axis, can be implemented only by means of considerably increased technical expenditures.

It is therefore an object of the invention to provide an adjusting system for a seat which permits a safe, reliable and flexible adjustment of a seat while its manufacturing and installation is simple and cost-effective.

This and other objects are achieved by the adjusting system for a seat according to the invention, particularly preferably for a vehicle seat. The adjusting system is used particularly for a seat in a passenger car. A longitudinal axis is defined for the seat, which indicates the viewing direction of a person sitting in the seat, as well as a transverse axis extending perpendicularly thereto and a vertical axis extending perpendicularly to the transverse axis and to the longitudinal axis. The longitudinal axis and the transverse axis, in particular, span a plane which extends parallel to the sitting surface of the seat. The adjusting system according to the invention comprises at least a first bearing ring that can be connected with the seat. In addition, the adjusting system comprises at least a second bearing ring that can be connected with a seat bearing. Between the first bearing ring and the second bearing ring, a plurality of adjusting rings is arranged, which are sequentially connected with one another. According to the invention, the adjusting rings can be rotated with respect to one another, in order to optionally swivel the seat about the longitudinal axis, about the transverse axis and about the vertical axis, i.e. in order to swivel it about the longitudinal axis, about the transverse axis and/or about the vertical axis. In particular, the swiveling takes place in a stepless manner in that the adjusting rings are mutually rotated at arbitrary angles with respect to one another. The first bearing ring and/or the second bearing ring is preferably designed for compensating the rotations of the adjusting rings. The adjusting rings as well as the first bearing ring and the second bearing ring are advantageously oriented such that adjacent adjusting rings and/or bearing rings contact one another at abutting faces, particularly entirely over the circumference.

It is preferably provided that the adjusting rings comprise a first adjusting ring and a second adjusting ring, the first adjusting ring and the second adjusting ring having a wedge-shaped design. In this manner, a stepless tilting of the first bearing ring relative to the second bearing ring becomes possible. For this purpose, the first adjusting ring and the second adjusting ring have to be rotated with respect to one another.

Likewise, it is particularly preferably provided that the first adjusting ring and the second adjusting ring each have a horizontal end and an inclined end. In particular, the first adjusting ring has a first horizontal end and a first inclined end, while the second adjusting ring has a second horizontal end and a second inclined end. In this case, the first inclined end of the first adjusting ring is, in particular, rotatably disposed at the second inclined end of the second adjusting ring. In this manner, a composite of the first adjusting ring and the second adjusting ring is created, where the wedge-shaped further developments of the first adjusting ring and of the second adjusting ring mutually cancel or reinforce one another. In this manner, a swiveling of the seat from the horizontal position into a plurality of swiveling directions can be implemented.

Advantageously, the adjusting rings comprise a third adjusting ring, whereby, as a result of a rotation of the third adjusting ring and/or as a result of a rotation of the other adjusting rings with respect to the third adjusting ring, an adjusting of the seat can be implemented along the vertical axis.

Particularly preferably, the third adjusting ring is equipped with a thread. The third adjusting ring is particularly arranged such that a further adjusting ring, particularly preferably the first adjusting ring or the second adjusting ring, engages with the thread of the third adjusting ring. As an alternative, it is preferably provided that the first bearing ring or the second bearing ring engages with the thread. In this manner, the adjusting rings can be telescoped, so that a distance between the first bearing ring and the second bearing ring can be adjusted.

As an alternative, the third adjusting ring is preferably provided with a groove. In particular, the groove extends at least in areas in a coiled manner on an exterior lateral surface of the third adjusting ring. It is particularly preferably provided that, at least in areas, the groove extends in a direction that has at least one component in the direction of the vertical axis. In addition, it is advantageously provided that an additional adjusting ring or the first bearing ring or the second bearing ring has a spring and/or a bolt, the spring and the bolt being guided in the groove of the third adjusting ring. The adjusting rings can be telescoped also in this manner, so that a distance between the first bearing ring and the second bearing ring can be adjusted.

Particularly preferably, an adjustment of the seat along the vertical axis can be implemented by a rotation of the third adjusting ring. For this purpose, it is advantageously provided that, as a result of a rotation of the third adjusting ring, the additional adjusting ring or the first bearing ring or the second bearing ring is screwed farther into the thread of the third adjusting ring or screwed out of the latter. As an alternative, as a result of the rotation of the third adjusting ring, the additional adjusting ring or the first bearing ring or the second bearing ring can be moved within the groove of the third adjusting ring. By means of the orientation of the groove, a relative linear motion therefore takes place between the third adjusting ring and the additional adjusting ring or the first bearing ring or the second bearing ring. As a result of the rotation of the third adjusting ring, the distance between the first bearing ring and the second bearing ring can be adjusted along the vertical axis. A height of the seat can be adjusted in this manner.

The adjusting system is advantageously designed such that the adjusting rings are rotatably disposed on the first bearing ring and/or on the second bearing ring. As an alternative or in addition, it is provided that the adjusting rings are disposed to be rotatable with respect to one another. As a result of the rotation of the adjusting rings, particularly relative to the first bearing ring and/or the second bearing ring, movement of the seat can advantageously be implemented. High functionality of the seat can thereby be achieved, whereby in particular it becomes almost impossible for parts of one's body to become stuck during the adjusting of the seat. The adjusting system according to the invention therefore offers a high degree of safety during the operation.

Furthermore, the invention relates to a seat that includes an above-described adjusting system. The seat can therefore very easily and safely be swiveled about its longitudinal axis, vertical axis and transverse axis. The seat preferably is a vehicle seat.

The first bearing ring is advantageously integrated in the seat. This permits a simple and cost-effective installation of the seat according to the invention. The integration of the first bearing ring in the seat can particularly be implemented by a joining process, whereby, as an alternative, the integration can be implemented by a form-fitting, fictional or bonded connection.

It is further preferably provided that the seat includes at least one bearing rail. In this case, the second bearing ring, in particular, is connected with the bearing rail. In addition, the bearing rail can advantageously be movably disposed along the longitudinal axis on the seat bearing. The bearing rail thereby makes it possible for the seat to move along its longitudinal axis. In this case, the rail system consists of several parts which permit a relative movement along the longitudinal axis. A portion of the rail system is fastened to a floor on which the seat is to be disposed. As an alternative, the second bearing ring can preferably be connected with a floor on which the seat is to be disposed.

The adjusting system according to the invention, as well as the seat of the invention according to the above-described embodiments, permits high functionality during the movement of the seat while the production costs are nevertheless reasonable. Particularly preferably, the seat can be used in a motor vehicle. As a result of the large number of movement capabilities of the seat, the occupants' comfort is clearly increased, in particular, injuries to the occupants as a result of the movement of the seat are almost excluded.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
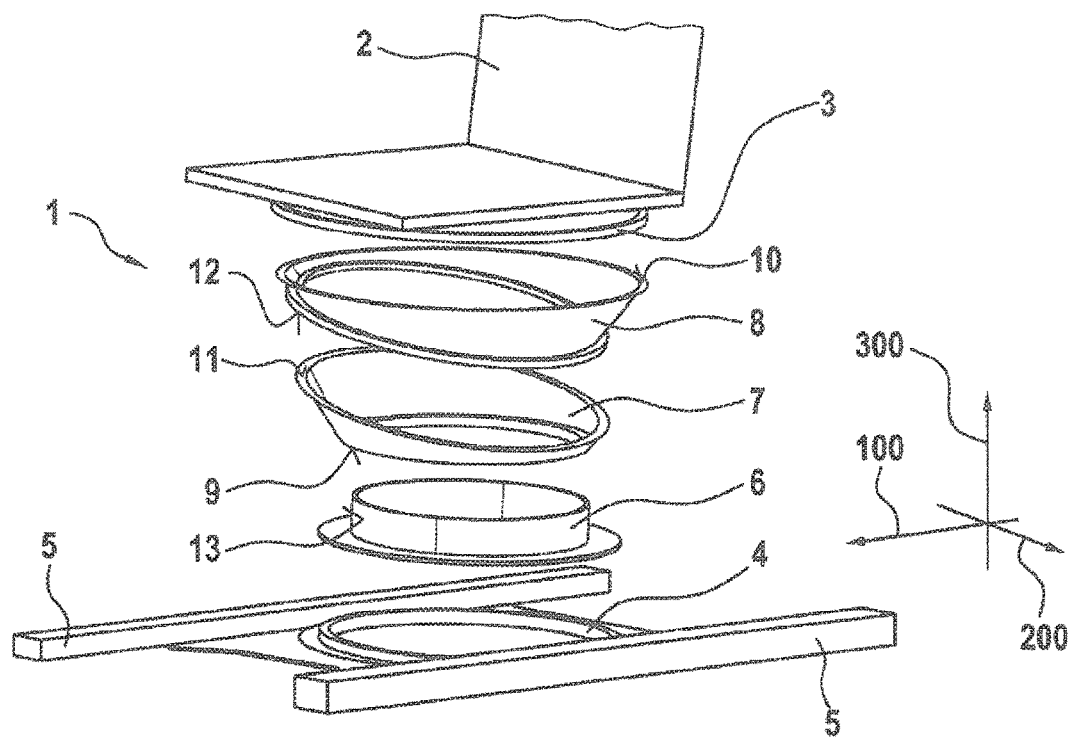
FIG. 1 is a schematic exploded view of a seat having an adjusting system according to an embodiment of the invention.
Figure 2:
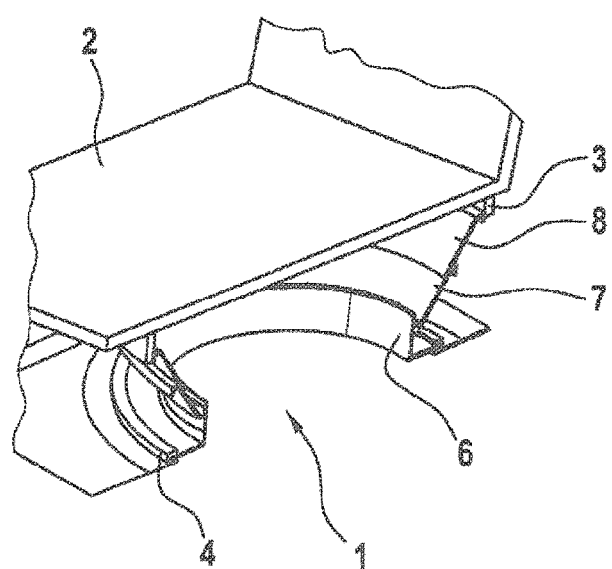
FIG. 2 is a schematic sectional view of the seat and of the adjusting system according to the embodiment of the invention.

FIG. 1 is a schematic view of a seat 2, which is equipped with an adjusting system 1 according to an embodiment of the invention. FIG. 2 is a sectional view of the illustration of FIG. 1. The seat 2 has a first bearing ring 3 which extends about a vertical axis 300 of the seat 2. In addition to the vertical axis 300, a longitudinal axis 100 is defined for the seat 2, a user of the seat 2 looking in the direction of the longitudinal axis when sitting in the seat 2. A transverse axis 200 of the seat 2 is defined perpendicularly to the vertical axis and the longitudinal axis 100. The first bearing ring 3 of the seat 2 is advantageously integrated in the seat 2. In particular, the seat 2 is a vehicle seat which can be installed in a vehicle. Particularly preferably, the seat 2 can be used in a motor vehicle.

In addition, the adjusting system 1 has a second bearing ring 4 which is connected with two bearing rails 5. The bearing rails 5 can particularly be disposed on a seat mounting (not shown), in which case the bearing rails 5 make it possible for the seat 2 to move along the longitudinal axis 100.

A first adjusting ring 7, a second adjusting ring 8 and a third adjusting ring 6 are mounted between the first bearing ring 3 and the second bearing ring 4. The first adjusting ring 7 and the second adjusting ring 8 have a wedge-shaped design. The first adjusting ring 7 has a first horizontal end (end face) 9 as well as a first inclined end (end face) 11. Likewise, the second adjusting ring 8 has a second horizontal end (end face) 10 and a second inclined end (end face) 12. In this case, particularly the first inclined end 11 of the first adjusting ring 7 is connected with the second inclined end 12 of the second adjusting ring 8. In this case, this connection permits a rotation of the first adjusting ring 7 relative to the second adjusting ring 8. The first inclined end 11 remains completely in contact with the second inclined end 12.

The first adjusting ring 7 is connected with the third adjusting ring 6. The third adjusting ring 6 has a thread 13, into which the first adjusting ring 7 is screwed.

The third adjusting ring 6 is rotatably disposed on the second bearing ring 4. In particular, the third adjusting ring 6 is disposed on the second bearing ring 4 so as to be rotatable about the vertical axis 300. The second bearing ring 4 and/or the first adjusting ring 7 thereby compensates a rotation of the third adjusting ring 6.

The second adjusting ring 8 is advantageously disposed on the first bearing ring 3 so as to be rotatable about the vertical axis 300. The first bearing ring 3 thereby compensates a rotation of the second adjusting ring 8.

A versatile adjustability of the seat 2 is provided by rotating the first adjusting ring 7, the second adjusting ring 8 and/or the third adjusting ring 6 relative to one another and/or relative to the first bearing ring 3 and/or relative to the second bearing ring 4. This is particularly illustrated in FIGS. 3 to 6. In FIGS. 3 to 6, identical or functionally identical characteristics are provided with the same reference numbers as in FIGS. 1 and 2.

Figure 3:
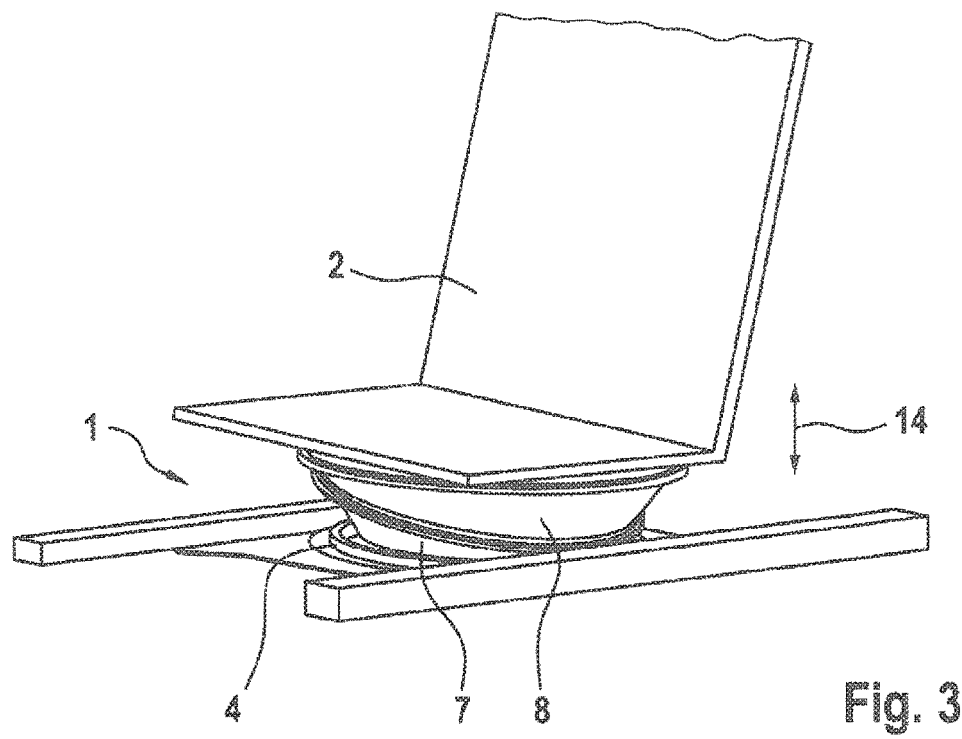
FIG. 3 is a first schematic view of the seat when its height is adjusted by way of the adjusting system according to the embodiment of the invention.
Figure 4:
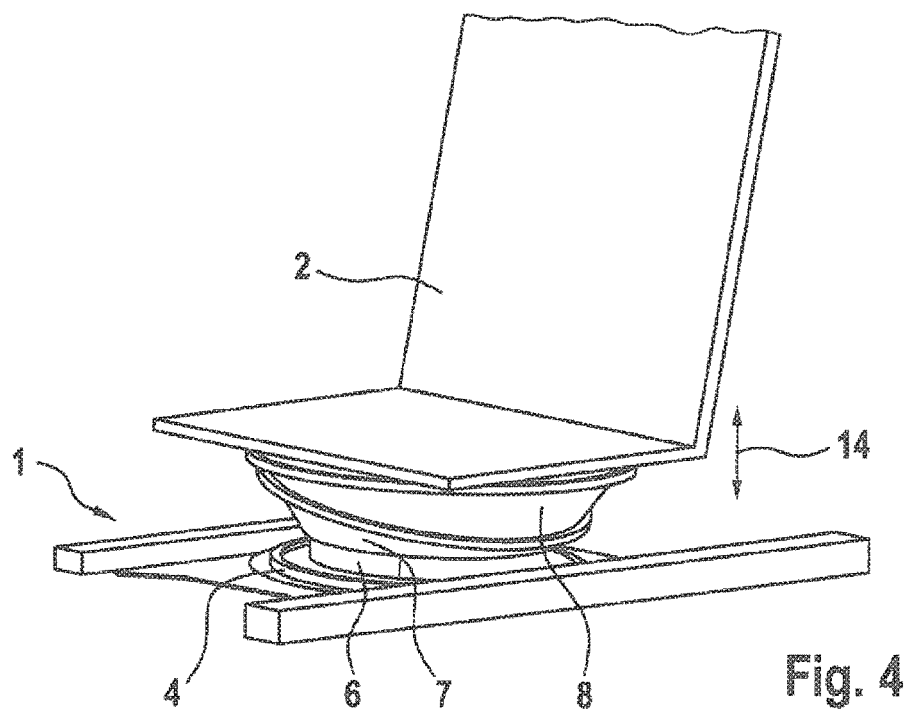
FIG. 4 is a second schematic view of the seat when its height is adjusted by way of the adjusting device according to the embodiment of the invention.

FIGS. 3 and 4 show an adjustment of the seat 2 by a first movement 14. The first movement 14 corresponds to an adjustment of the seat 2 along the vertical axis 300 (compare FIG. 1). For carrying out the first movement 14, the third adjusting ring 6 is to be rotated relative to the first adjusting ring 7 and to the second adjusting ring 8. The first adjusting ring 7 remains constant, particularly in its alignment to the second adjusting ring 8. For carrying out the first movement 14, the third adjusting ring 6 therefore is to be rotated, on the one hand; as an alternative, a rotation of the first adjusting ring 7 together with the second adjusting ring 8 can be implemented. By means of the two rotations, the first adjusting ring 7 can be screwed into and out of the thread 13 of the third adjusting ring 6. As soon as the first adjusting ring 7 has been screwed completely into the thread 13 of the third adjusting ring 6, a lowest position of the seat 2 will have been reached. This is illustrated in FIG. 3. As soon as the first adjusting ring 7 has been maximally screwed out of the thread 13 of the third adjusting ring 6, a highest position of the seat 2 will have been reached. This is illustrated in FIG. 4.

Figure 5:
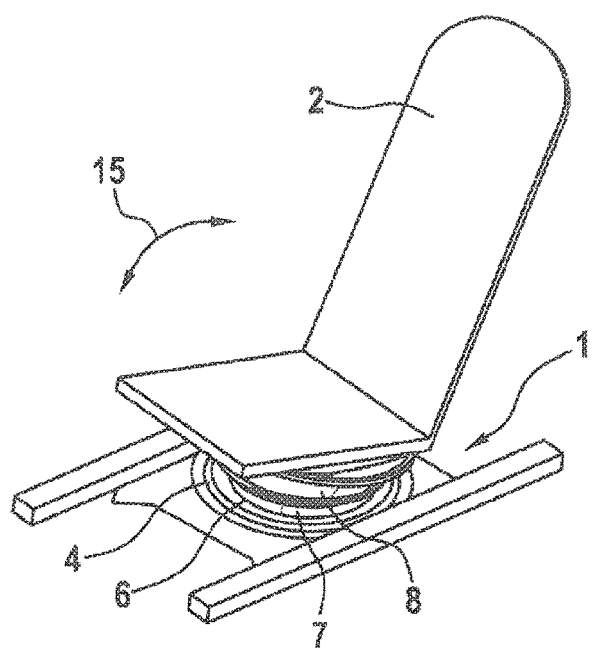
FIG. 5 is a schematic view of the seat with the adjusting system according to the embodiment of the invention during the swiveling of the seat about the transverse axis.

FIG. 5 illustrates a second movement 15 of the seat 2. The second movement 15 is a swiveling of the seat 2 about the transverse axis 200 (compare FIG. 1). For carrying out the second movement 15, an opposed rotation of the first adjusting ring 7 and of the second adjusting ring 8 takes place. In this case, the first adjusting ring 7 is rotated particularly together with the third adjusting ring 6, in order to avoid the occurrence of the first movement 14. As a result of the opposed rotation of the first adjusting ring 7 and of the second adjusting ring 8, a tilting of the first bearing ring takes place about the transverse axis 200. The seat is thereby swiveled about the transverse axis 200, whereby the second movement 15 is generated. A conceivable tilting of the seat 2 about the longitudinal axis 100 (compare FIG. 1) can be compensated by the opposed movement of the first adjusting ring 7 and of the second adjusting ring 8.

Figure 6:
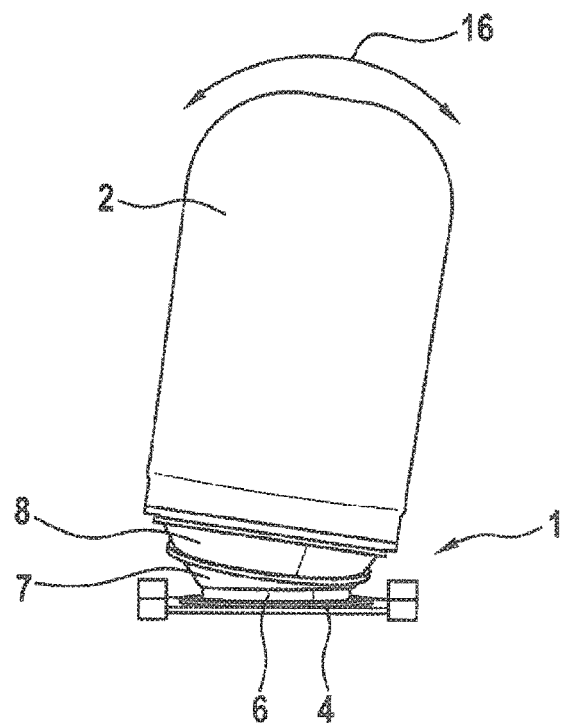
FIG. 6 is a schematic view of the seat with the adjusting system according to the embodiment of the invention during the swiveling of the seat about the longitudinal axis.

FIG. 6 finally illustrates the moving of the seat 2 by way of a third movement 16. The third movement 16 is a swiveling of the seat 2 about the longitudinal axis 100 (compare FIG. 1). For carrying out the third movement 16, the first adjusting ring 7 and the second adjusting ring 8, in turn, are rotated in an opposed manner. The first adjusting ring 7, particularly together with the third adjusting ring 6, is, in turn, rotated in order to avoid the occurrence of the first movement 14. By means of the opposed rotation of the first adjusting ring 7 and the second adjusting ring 8, the occurrence of the second movement 15 can be compensated. A tilting of the first bearing ring 3 about the longitudinal axis 100 thereby takes place from the rotation of the first adjusting ring 7 and of the second adjusting ring 8. This leads to a swiveling of the seat 2 about the longitudinal axis, whereby the third movement 16 is generated.

As a result of the superposition of movements of the first adjusting ring 7, of the second adjusting ring 8 and of the third adjusting ring 6, a combination of the first movement 14, of the second movement 15 and of the third movement 16 can be implemented. The seat 2 can therefore very flexibly be swiveled in different directions. Since only rotations of the adjusting rings 6, 7, 8 occur, it will be almost impossible for a user of the seat to suffer injuries. In particular, in the case of the adjusting system 1 of the invention according to the illustrated embodiment, it would hardly be possible to get fingers or feet caught, which frequently is a risk in the prior art.

The rotation of the first adjusting ring 7, of the second adjusting ring 8 and of the third adjusting ring 6 can particularly be implemented by actuators. As an alternative, the rotation of the adjusting rings 6, 7, 8 takes place manually.

The invention advantageously makes it possible to implement in a very simple manner a plurality of comfort functions which are preferably used in vehicles. Thus, for example, a so-called active seat function—which is a reciprocal moving of the seat 2 about the longitudinal axis 100 (compare the third movement)—can be implemented very easily. Likewise, the adjusting system allows an inclining of the seat 2 during cornering in order to thereby lean the seat 2 into the curve. In addition, the first adjusting ring 7, the second adjusting ring 8 and the third adjusting ring 6 permit a stepless adjusting of the inclination of the seat 2, as desired by the user of the seat 2.

LIST OF REFERENCE NUMBERS

1 Adjusting system
2 Seat
3 First bearing ring
4 Second bearing ring
5 Bearing rail
6 Third adjusting ring
7 First adjusting ring
8 Second adjusting ring
9 First horizontal end
10 Second horizontal end
11 First inclined end
12 Second inclined end
13 Thread
14 First movement
15 Second movement
16 Third movement
100 Longitudinal axis of the seat
200 Transverse axis of the seat
300 Vertical axis of the seat The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An adjusting system for a seat, a longitudinal axis being defined for the seat, which longitudinal axis indicates a viewing direction of a person sitting in the seat, as well as a transverse axis extending perpendicularly thereto and a vertical axis extending perpendicularly to the transverse axis and to the longitudinal axis, the adjusting system comprising:
- at least a first bearing ring, which is connectable with the seat;
- at least a second bearing ring, which is connectable with a seat mounting; and
- a plurality of adjusting rings, which are sequentially connected with one another and which are arranged between the first bearing ring and the second bearing ring, wherein
- the plurality of adjusting rings engage with one another and are rotatable with respect to one another in order to swivel the seat about one or more of the longitudinal axis, the transverse axis and the vertical axis,
- the plurality of adjusting rings comprise a first adjusting ring and a second adjusting ring, and
- the first adjusting ring and the second adjusting ring have a wedge-shaped design when viewed from a direction of the longitudinal or transverse axis.

2. The adjusting system according to claim 1, wherein:
the plurality of adjusting rings have a third adjusting ring, and
the seat is adjustable along the vertical axis as a result of a rotation of the third adjusting ring or a rotation of the first and second adjusting rings with respect to the third adjusting ring.

3. The adjusting system according to claim 1, wherein:
the plurality of adjusting rings are rotatably disposed on a respective one of the first bearing ring and the second bearing ring.

4. The adjusting system according to claim 1, wherein the adjusting system is configured for a motor vehicle seat.

5. An adjusting system for a seat, a longitudinal axis being defined for the seat, which longitudinal axis indicates a viewing direction of a person sitting in the seat, as well as a transverse axis extending perpendicularly thereto and a vertical axis extending perpendicularly to the transverse axis and to the longitudinal axis, the adjusting system comprising:
- at least a first bearing ring, which is connectable with the seat;
- at least a second bearing ring, which is connectable with a seat mounting; and
- a plurality of adjusting rings, which are sequentially connected with one another and which are arranged between the first bearing ring and the second bearing ring, wherein:
- the plurality of adjusting rings are rotatable with respect to one another in order to swivel the seat about one or more of the longitudinal axis, the transverse axis and the vertical axis,
- the plurality of adjusting rings comprise a first adjusting ring and a second adjusting ring, the first adjusting ring and the second adjusting ring have a wedge-shaped design,
- the first adjusting ring has a first horizontal end and a first inclined end,
- the second adjusting ring has a second horizontal end and a second inclined end, and
- the first inclined end of the first adjusting ring is rotatably disposed on the second inclined end of the second adjusting ring.

6. The adjusting system according to claim 5, wherein:
the plurality of adjusting rings have a third adjusting ring, and
the seat is adjustable along the vertical axis as a result of a rotation of the third adjusting ring or a rotation of the first and second adjusting rings with respect to the third adjusting ring.

7. The adjusting system according to claim 6, wherein:
the third adjusting ring comprises a thread, and
the first bearing ring or the second bearing ring is engaged with the thread.

8. A seat, comprising:
an adjusting system for the seat, a longitudinal axis being defined for the seat, which longitudinal axis indicates a viewing direction of a person sitting in the seat, as well as a transverse axis extending perpendicularly thereto and a vertical axis extending perpendicularly to the transverse axis and to the longitudinal axis, the adjusting system comprising:
- at least a first bearing ring, which is connected with the seat;
- at least a second bearing ring, which is connected with a seat mounting; and
- a plurality of adjusting rings, which are sequentially connected with one another and which are arranged between the first bearing ring and the second bearing ring, wherein
- the plurality of adjusting rings engage with one another and are rotatable with respect to one another in order to swivel the seat about one or more of the longitudinal axis, the transverse axis and the vertical axis,
- the plurality of adjusting rings comprise a first adjusting ring and a second adjusting ring, and
- the first adjusting ring and the second adjusting ring have a wedge-shaped design when viewed from a direction of the longitudinal or transverse axis.

9. The seat according to claim 8, wherein the first bearing ring is integrated in the seat.

10. The seat according to claim 9, further comprising:
at least one bearing rail, wherein
the second bearing ring is connected with the at least one bearing rail, and
the at least one bearing rail disposed on a seat bearing is movable along the longitudinal axis.

11. The seat according to claim 8, wherein the second bearing ring is disposable on a floor on which the seat is to be disposed.

12. The seat according to claim 8, wherein the seat is a motor vehicle seat.

* * * * *